(12) United States Patent
Liang

(10) Patent No.: US 6,975,405 B2
(45) Date of Patent: Dec. 13, 2005

(54) METHOD AND APPARATUS FOR MEASURING FLATNESS AND/OR RELATIVE ANGLE BETWEEN TOP AND BOTTOM SURFACES OF A CHIP

(75) Inventor: Jason Liang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 10/439,724

(22) Filed: May 16, 2003

(65) Prior Publication Data

US 2004/0227957 A1    Nov. 18, 2004

(51) Int. Cl.⁷ ................................................ G01B 9/02
(52) U.S. Cl. ..................................... 356/496; 356/511
(58) Field of Search ..................... 356/489, 511, 512, 356/513, 514, 515, 495, 612, 613; 250/559.37

(56) References Cited

U.S. PATENT DOCUMENTS

| | | | | |
|---|---|---|---|---|
| 4,627,733 A | | 12/1986 | Wada | ........................... 356/359 |
| 5,995,226 A | * | 11/1999 | Abe et al. | ..................... 356/511 |
| 6,100,977 A | * | 8/2000 | Muller | ........................ 356/499 |
| 6,480,286 B1 | * | 11/2002 | Kubo et al. | .................. 356/503 |

FOREIGN PATENT DOCUMENTS

| | | | | |
|---|---|---|---|---|
| JP | 56028593 | | 6/1982 | ............. G11B 5/12 |
| JP | 57116206 A | | 7/1982 | ............ G01B 11/26 |
| JP | 62052407 A | | 3/1987 | ............ G01B 11/30 |
| JP | 6052514 A | | 2/1994 | ............. G11B 5/39 |

OTHER PUBLICATIONS

P.Y. Hu et al., "Optical Flat for Measuring Tape Wrap Angle", Research Disclosure, Jul. 1989, No. 203.
A.S. Jones et al., "Static Tester for Thin Film Magnetic Heads", IBM Technical Disclosure Bulletin, Jan. 1973, vol. 15, No. 8.
J.W. Billman et al., "Method of Checking Magnetic Head", IBM Technical Disclosure Bulletin, Mar. 1985, vol. 27, No. 10A.

* cited by examiner

*Primary Examiner*—Hwa (Andrew) Lee
(74) *Attorney, Agent, or Firm*—Zilka-Kotab, PC

(57) ABSTRACT

A system and method for obtaining metrics of a semiconductor chip are provided. A first surface of a chip is positioned on a substantially flat receiving surface. A topography of the receiving surface is measured. A topography of a second surface of the chip is also measured. A relative angle between the receiving surface and the second surface of the chip are determined using the measurements of the receiving surface and the second surface of the chip.

37 Claims, 3 Drawing Sheets

METHOD AND APPARATUS FOR MEASURING FLATNESS AND/OR RELATIVE ANGLE BETWEEN TOP AND BOTTOM SURFACES OF A CHIP

FIELD OF THE INVENTION

The present invention relates to semiconductor quality and tolerance testing, and more particularly, this invention relates to measuring flatness and/or a relative angle between top and bottom surfaces of a semiconductor chip.

BACKGROUND OF THE INVENTION

Precision electronic parts are being made smaller, and therefore have tighter tolerances. One area where this is particularly important is in the fabrication of flat tape heads.

Many tape heads have a top surface that is curved, defining the contact surface of the tape. One downside to this type of head is that each head must be fabricated individually. The tape bearing surface is rounded by moving the head back and forth in a pendulum-like motion in a viscous solution of diamond slurry. This is a very time consuming and expensive process.

Tape heads with a flat tape bearing surface, or flat heads, have recently emerged as an effective, yet less expensive alternative to rounded tape heads. FIG. 1 depicts one such tape head system 100. The head system includes of a pair of heads 102, each having a closure 104 that engages the tape 106 as it passes over the head. Each head is coupled to a block 108, which is in turn coupled to an actuator mechanism (not shown) of a tape drive system.

The pressure at which the tape engages the head affects the write/read performance and error rate. The wrap angle α, the angle that the tape is wrapped around the head, controls how the tape flies over the head, and thus, affects the pressure at which the tape engages the head. Slight variations from the design angle can result in significant degradations in performance. For example, if the specified wrap angle is less than one degree, a deviation of a few tenths or hundredths of a degree can have a large impact on write/read performance and error rate.

The flatness and relative angle of the top surface (tape bearing surface) 110 and bottom surface 112 of the head can affect the wrap angle of the tape over the head, and because the flat head works on the principle of wrapping the head at specific wrap angles, it is important to measure this parameter and disposition for it to within tenths, hundredths, or thousandths of a degree to verify that the head is within design tolerances.

Current measurement tools such as the Avant scope and optical technologies used in current manufacturing cannot achieve this accuracy. Nor are the results of these technologies repeatedly consistent. One reason that these technologies are inaccurate is because they do not take into account the way the bottom surface of the head actually sits on the actuator. Because the bottom surface of the head may be uneven, the head may sit at a slight angle when actually coupled to the actuator. This in turn will affect the wrap angle. Another reason that these technologies are inaccurate is because they do not take into account the reference surface that the part sits on during the measurement. Many technologies assume that the reference surface is perfectly flat. However, when trying to achieve accuracies of hundredths or thousandths of a degree, flatness is a relative term. A slight tilt or variation in the surface geometry of the reference surface can have significant effects on the angle that is measured.

What is therefore needed is a device and technique for measuring the flatness and relative angles of the top and bottom surfaces of the head reliably and accurately.

SUMMARY OF THE INVENTION

The present invention provides a system and method for measuring a relative angle between surfaces of a semiconductor chip, such as a tape head. A system according to one embodiment includes a substantially flat receiving surface for receiving a first surface of a chip. A contour measuring device measures a surface topography of the receiving surface and of a second surface of the chip. The surface topographies of the receiving surface and the second surface of the chip are used to determine the relative angle between the first and second surfaces of the chip.

A method for obtaining metrics of a semiconductor chip according to one embodiment includes positioning a first surface of a chip on a substantially flat receiving surface. A topography of the receiving surface is measured. A topography of a second surface of the chip is also measured. A relative angle between the receiving surface and the second surface of the chip are determined using the measurements of the receiving surface and the second surface of the chip.

In a preferred embodiment, the receiving surface is an optical flat and the contour measuring device is an optical measuring device, and ideally an interferometer. Also preferably, the relative angle is measured to a factor of tenths, hundredths, and thousandths of a degree. Multiple chips may be positioned on the receiving surface.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

For purposes of fabricating and assuring quality of certain types of semiconductor chips, it is desirable to measure the flatness and relative angle of top and bottom surfaces of the chips. The present description discloses a system and technique for measuring these parameters to within a few tenths, hundredths, and/or thousandths of a degree.

Figure 1:
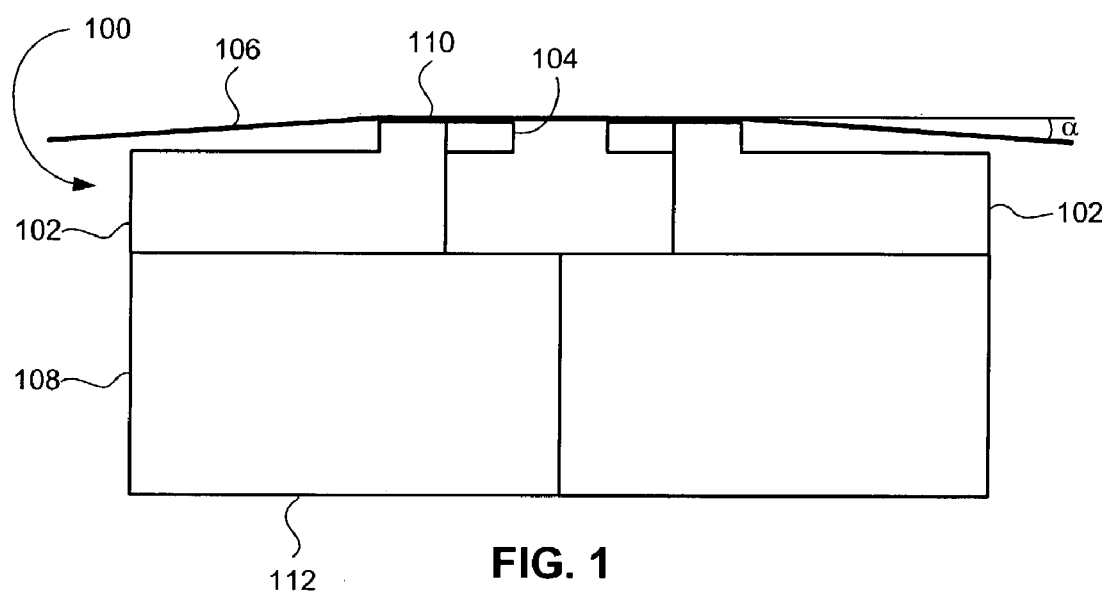
FIG. 1 is a side view of a tape head system.
Figure 2:
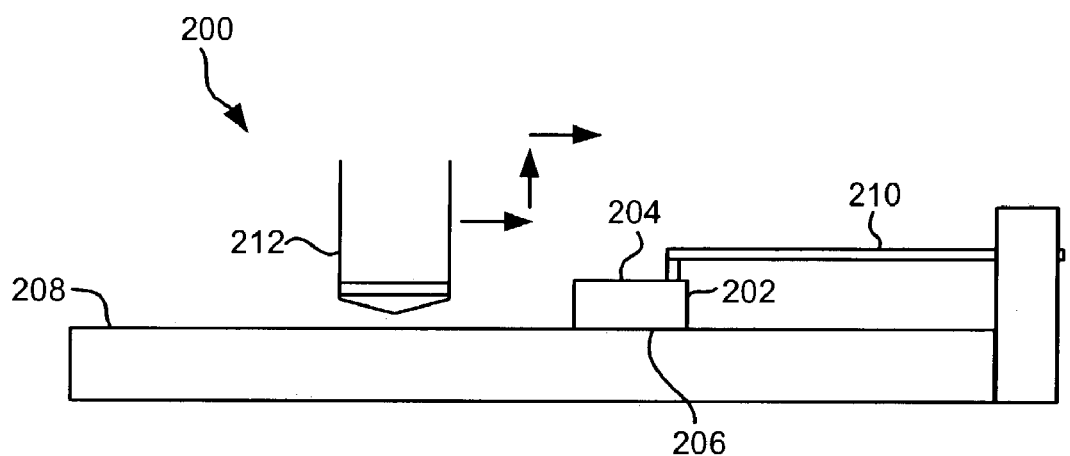
FIG. 2 is a side view of a device for measuring the flatness of the top and/or bottom surfaces and relative angle between the top and bottom surfaces of a chip.

FIG. 2 illustrates a device 200 for measuring the flatness of the top and/or bottom surfaces 204, 206 and relative angle between the top and bottom surfaces of a chip 202 such as a tape head or any other type of electronic element or part. As shown, the device includes a flat reflective receiving surface 208 and, optionally, some mechanism 210, such as an arm, for securing the chip to the receiving surface. The device further includes a contour measuring device 212 that is used to generate measurements of the general or precise contours of the top and/or bottom of the chip, and/or the receiving surface. The measurements obtained by the contour measuring device are in turn used to determine the flatness of the surfaces of the chip and/or the relative angle between the top and bottom surfaces of the chip.

The preferred technique is to measure the contour of the top of the chip, as well as measure the contour of the substantially flat receiving surface. The relative angle between the top and bottom surfaces of the chip is computed using the measurements obtained from the scanning using a technique known in the art. For example, if the either surface is not perfectly flat, a mean plane angle of the surfaces measured can be calculated from the data points taken by the contour measuring device. Various levels of filtering can also be used to interpolate the plane angle.

The receiving surface simulates the ultimate substrate that the chip will rest on when it is coupled to the end device. Because the way the bottom surface of the chip actually sits on the ultimate device determines the angle at which the top surface will ultimately reside, the angle of the top surface of the chip relative to the substantially flat receiving surface provides an accurate representation of the relative angle between the top and bottom surfaces of the chip.

The technique and device have the advantage of measuring the angle of the top surface of the chip as it would sit on the end device. In addition, the technique and device can achieve the desired accuracy by eliminating the material offset error between the top and bottom surfaces as well as eliminating error due to movement of the chip.

The substantially flat reflective receiving surface may be an unprocessed wafer of the same material as the chip. Ideally, the receiving surface is an optical flat meeting the specifications for optical flats set by the NIST (National Institute of Standards and Testing). Because an optical flat is the preferred receiving surface, the remaining discussion shall be with reference to an optical flat.

The contour measuring device is any device capable of obtaining measurements from which the plane angle of the surface being scanned can be determined. The measurements can be anywhere from general (i.e., two data points) to precise (i.e., thousands or millions of an inch).

In one embodiment, an optical contour measuring device, such as an optical interferometer, is used to scan the surrounding reflective receiving surface the chip rests on, and also scan the top surface of the chip.

An optical interferometer, such as a white light interferometer, uses light to measure the contours and angle of the surface of the target. The interferometer reflects light off a reflective surface and measures interference to obtain a topography of the surface. The surface of the optical flat and the top of head are measured. Then comparison of the measurements of the two surfaces is performed to obtain the relative angle between the top and bottom of the head. During the procedure, the system can level off of the optical flat. Note that the top surface of the chip can be scanned prior to scanning the receiving surface, or vice versa.

One suitable interferometer is the NewView 500 optical interferometer manufactured by Zygo Corporation. This interferometer is capable of measuring surface roughness and displaying a three-dimensional image of the surface. The vertical resolution of the interferometer is 0.2 nm for smooth surfaces and 20 nm for rougher surfaces. The resolution in the lateral plane is 0.56 microns. The interferometer measures the interference pattern created by reflected light from the surface of the sample. The measurement is non-contact and rapid with a single measurement taking as little as 17 seconds. Software allows a series of images to be taken and "stitched" together to analyze a larger area, e.g., up to 225 $mm^2$, on the surface of the sample.

Figure 3:
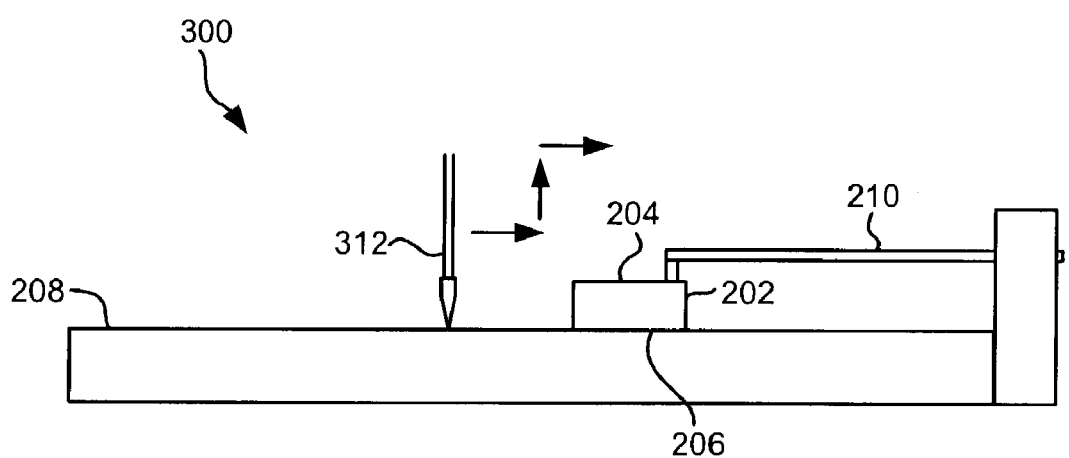
FIG. 3 is a side view of another system for measuring the relative flatness and relative angle of top and bottom surfaces of the chip.

FIG. 3 depicts another system 300 for measuring the relative flatness and relative angle of top and bottom surfaces of the chip. This system uses a stylus-type device 312 that is dragged along surface of optical flat and the top surface of the chip to obtain their contour profiles and mean plane angles. Again, the system can level off of the optical flat.

Figure 4:
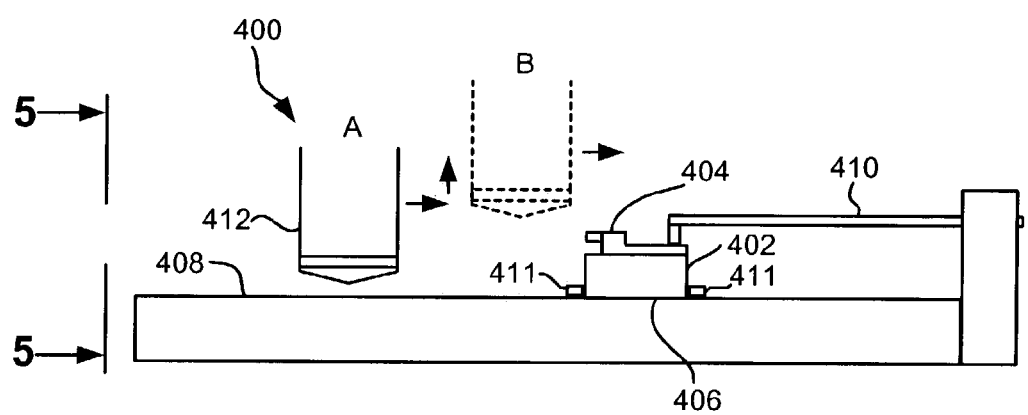
FIG. 4 is a side view of an illustrative system used to measure the flatness of the top and bottom surfaces of a tape head, and to measure the relative angle between the top and bottom surfaces of the tape head.
Figure 5:
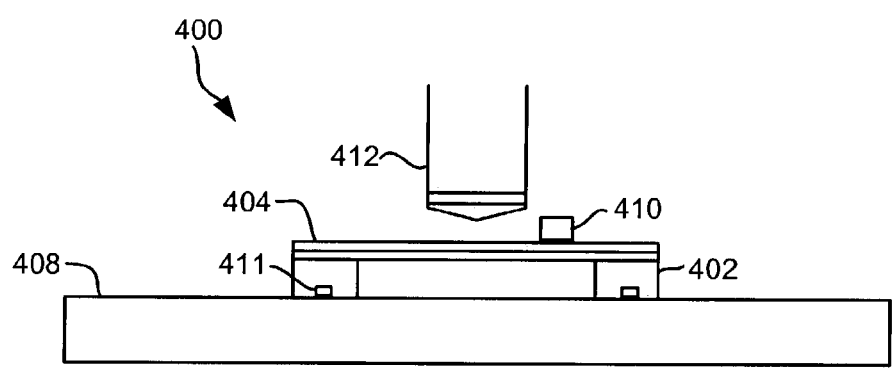
FIG. 5 is a front view of the system of FIG. 4.

FIG. 4 illustrates an illustrative system 400 used to measure the flatness of the top and bottom surfaces 404, 406 of a flat tape head 402, and to measure the relative angle between the top and bottom surfaces of the tape head, according to one embodiment. FIG. 5 depicts a front view of the system of FIG. 4 taken from line 5—5 of FIG. 4.

As discussed above, one of the things that contributes to the wrap angle is the flatness of the top relative to the bottom of the head, i.e., the relative angle. The top surface is the surface that engages the tape, i.e., the tape bearing surface. Flat tape heads are often most effective when the top and bottom surfaces of the head are parallel to each other. Because the head will later be coupled to an actuator mechanism in a tape drive, this system has the advantage of measuring the angle of the top surface of the head as it would sit on the head actuator assembly. Further, this methodology has improved repeatability and provides consistent results.

The bottom surface of the head is positioned on the optical flat 408 (which simulates the actuator assembly) and an arm 410 pins the head to the optical flat to prevent its movement. Guides 411 can also be employed to assist in preventing movement of the head. An optical interferometer 412 (or other contour measuring device) begins at position A and scans the optical flat. The interferometer is then lifted a specified distance (such as the estimated height of the head) to position B and the top surface of the chip is scanned. If necessary, filtering and leveling of either surface can be performed. Then a comparison of the measurements of the two surfaces is performed to calculate the relative angle between the top and bottom of the head.

The head can also be inverted to obtain measurements of the bottom surface of the head.

The processes and systems described herein can also be automated for batches of chips so that multiple chips can be tested at once. The chips are loaded onto the testing device, manually or automatically, and tested consecutively or in bulk. Preferably, the chips are loaded onto a tray that is removable from the system so that the system can measure other types and sizes of chips.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system for measuring a relative angle between surfaces of a semiconductor chip, comprising:

a substantially flat receiving surface for receiving a first surface of a chip; and a contour measuring device for measuring a surface topography of the receiving surface and of a second surface of the chip;

wherein the surface topographies of the receiving surface and the second surface of the chip are used to estimate the relative angle between the first and second surfaces of the chip.

2. A system as recited in claim 1, wherein the receiving surface is an optical flat.

3. A system as recited in claim 1, wherein the contour measuring device is an optical measuring device.

4. A system as recited in claim 3, wherein the optical measuring device is an interferometer.

5. A system as recited in claim 1, wherein the contour measuring device is a stylus-type device.

6. A system as recited in claim 1, wherein the chip is a tape head.

7. A system as recited in claim 6, wherein the second surface of the tape head is a substantially flat tape bearing surface.

8. A system as recited in claim 1, wherein the relative angle is measured to a factor of tenths of a degree.

9. A system as recited in claim 1, wherein the relative angle is measured to a factor of hundredths of a degree.

10. A system as recited in claim 1, wherein the relative angle is measured to a factor of thousandths of a degree.

11. A system as recited in claim 1, wherein multiple chips are positioned on the receiving surface.

12. A system as recited in claim 1, further comprising determining a flatness of the second surface of the chip.

13. A system for measuring a relative angle between surfaces of a semiconductor chip, comprising:

an optical flat having a receiving surface for receiving a first surface of a chip; and an optical interferometer for measuring a surface topography of the receiving surface and of a second surface of the chip;

wherein the surface topographies of the receiving surface and the second surface of the chip are used to estimate the relative angle between the first and second surfaces of the chip.

14. A system as recited in claim 13, wherein the chip is a tape head.

15. A system as recited in claim 14, wherein the second surface of the tape head is a substantially flat tape bearing surface.

16. A system as recited in claim 13, wherein the relative angle is measured to a factor of at least one of tenths, hundredths and thousandths of a degree.

17. A system as recited in claim 13, wherein multiple chips are positioned on the optical flat.

18. A system for measuring a relative angle between surfaces of a tape head, comprising:

an optical flat having a receiving surface for receiving a first surface of a tape head, wherein the tape head has a substantially flat tape bearing surface; and an optical interferometer for measuring a surface topography of the receiving surface and of a second surface of the chip;

wherein the surface topographies of the receiving surface and the second surface of the chip are used to estimate the relative angle between the first and second surfaces of the chip;

wherein the relative angle is measured to a factor of at least one of tenths, hundredths, and thousandths of a degree.

19. A system as recited in claim 18, wherein multiple heads are positioned on the optical flat.

20. A method for obtaining metrics of a semiconductor chip, comprising:

positioning a first surface of a chip on a substantially flat receiving surface;

measuring a surface topography of the receiving surface;

measuring a surface topography of a second surface of the chip; and determining a relative angle between the receiving surface and the second surface of the chip using the measurements of the receiving surface and the second surface of the chip.

21. A method as recited in claim 20, wherein the substantially flat surface is an optical flat.

22. A method as recited in claim 20, wherein the topographies are measured using an optical measuring device.

23. A method as recited in claim 22, wherein the optical measuring device is an interferometer.

24. A method as recited in claim 20, wherein topographies are measured using a stylus-type device.

25. A method as recited in claim 20, wherein the chip is a tape head.

26. A method as recited in claim 25, wherein the second surface of the tape head is a substantially flat tape bearing surface.

27. A method as recited in claim 20, wherein the relative angle is measured to a factor of tenths of a degree.

28. A method as recited in claim 20, wherein the relative angle is measured to a factor of hundredths of a degree.

29. A method as recited in claim 20, wherein the relative angle is measured to a factor of thousandths of a degree.

30. A method as recited in claim 20, wherein multiple chips are positioned on the receiving surface, wherein the method is consecutively repeated for each of the chips.

31. A method as recited in claim 20, wherein multiple chips are positioned on the receiving surface, wherein the method is simultaneously performed on multiple chips.

32. A method as recited in claim 20, further comprising determining a flatness of the second surface of the chip.

33. A method for obtaining metrics of a semiconductor chip, comprising:

positioning a first surface of a chip on an optical flat having a receiving surface;

measuring a surface topography of the receiving surface using an optical interferometer;

measuring a surface topography of a second surface of the chip using the optical interferometer; and determining a relative angle between the receiving surface and the second surface of the chip using the optical measurements of the receiving surface and the second surface of the chip, wherein the relative angle is measured to a factor of at least tenths of a degree.

34. A method as recited in claim 33, further comprising determining a flatness of the second surface of the chip.

35. A method as recited in claim 33, wherein the chip is a tape head.

36. A method as recited in claim 35, wherein the second surface of the tape head is a substantially flat tape bearing surface.

37. A method as recited in claim 33, wherein multiple chips are positioned on the optical flat, wherein the method is performed for each of the chips.

* * * * *